United States Patent
Lee et al.

(10) Patent No.: US 10,957,488 B2
(45) Date of Patent: Mar. 23, 2021

(54) MULTILAYER CERAMIC ELECTRONIC COMPONENT

(71) Applicant: SAMSUNG ELECTRO-MECHANICS CO., LTD., Suwon-si (KR)

(72) Inventors: Min Gon Lee, Suwon-si (KR); Seung Woo Song, Suwon-si (KR); Jae Yeol Choi, Suwon-si (KR); Jin Kyung Joo, Suwon-si (KR); Taek Jung Lee, Suwon-si (KR); Jin Man Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/170,499

(22) Filed: Oct. 25, 2018

(65) Prior Publication Data

US 2019/0326058 A1  Oct. 24, 2019

(30) Foreign Application Priority Data

Apr. 20, 2018 (KR) .................. 10-2018-0046195
Aug. 3, 2018 (KR) .................. 10-2018-0090639

(51) Int. Cl.
*H01G 4/232* (2006.01)
*H01G 4/30* (2006.01)
(Continued)

(52) U.S. Cl.
CPC ......... *H01G 4/2325* (2013.01); *H01G 4/1227* (2013.01); *H01G 4/248* (2013.01); *H01G 4/30* (2013.01); *H01G 4/012* (2013.01)

(58) Field of Classification Search
CPC ........... H01G 4/30; H01G 4/228; H01G 4/232
See application file for complete search history.

(56) References Cited

U.S. PATENT DOCUMENTS

| 2008/0080120 A1* | 4/2008 | Togashi | ............... H01G 4/35 361/301.4 |
| 2013/0242457 A1 | 9/2013 | Lee et al. | |

(Continued)

FOREIGN PATENT DOCUMENTS

| JP | 06196351 A | * 7/1994 | ........... H01G 4/2325 |
| JP | 2015-026825 A | 2/2015 | |

(Continued)

OTHER PUBLICATIONS

Notice of Office Action issued in Korean Patent Application No. 10-2018-0170238 dated Jan. 17, 2020 (With English Translation).

*Primary Examiner* — Eric W Thomas
(74) *Attorney, Agent, or Firm* — Morgan, Lewis & Bockius LLP (57) ABSTRACT

A multilayer ceramic electronic component includes: a ceramic body and first and second external electrodes on external surfaces of the ceramic body. The ceramic body includes first and second internal electrodes facing each other with dielectric layers interposed therebetween. The ceramic body includes an active portion in which capacitance is formed and cover portions on upper and lower surfaces of the active portion, respectively. The ratio of the thickness of the first and second external electrodes to the thickness of the cover portion is proportional to the inverse of the cube root of the ratio of the Young's Modulus of each of the first and second external electrodes to the Young's modulus of the cover portion.

7 Claims, 6 Drawing Sheets

(51) Int. Cl.
*H01G 4/248* (2006.01)
*H01G 4/12* (2006.01)
*H01G 4/012* (2006.01)

(56) References Cited

U.S. PATENT DOCUMENTS

| | | |
|---|---|---|
| 2014/0185189 A1 | 7/2014 | Kim et al. |
| 2014/0367152 A1* | 12/2014 | Lee ........................ H05K 1/111 |
| | | 174/260 |
| 2015/0021079 A1* | 1/2015 | Lee .......................... H01G 2/06 |
| | | 174/260 |
| 2016/0099108 A1 | 4/2016 | Koide et al. |
| 2016/0293331 A1* | 10/2016 | Kitamura ................. H01G 4/12 |

FOREIGN PATENT DOCUMENTS

| | | |
|---|---|---|
| KR | 2013-0104360 A | 9/2013 |
| KR | 10-2014-0085097 A | 7/2014 |
| KR | 10-2015-0011268 A | 1/2015 |
| KR | 10-2015-0049162 A | 5/2015 |

\* cited by examiner

MULTILAYER CERAMIC ELECTRONIC COMPONENT

CROSS-REFERENCE TO RELATED APPLICATION(S)

This application claims benefit of priority to Korean Patent Application Nos. 10-2018-0046195 filed on Apr. 20, 2018 and 10-2018-0090639 filed on Aug. 3, 2018 in the Korean Intellectual Property Office, the disclosure of which is incorporated herein by reference in its entirety.

BACKGROUND

1. Field

The present disclosure relates to a multilayer ceramic electronic component, and more particularly, to a multilayer ceramic electronic component having excellent reliability.

2. Description of Related Art

Recently, in accordance with increasing mounting density on circuit boards, there has been an increased need to reduce the mounting area of multilayer ceramic capacitors. In addition, there has been an increased demand for multilayer ceramic capacitors with reduced thickness so as to be embedded in the board or mounted in an LSC type at a lower end portion of an application processor (AP).

A large effect is accomplished in reducing equivalent series inductance (ESL) generated in the board as well as reducing mounting area, and demand for a multilayer ceramic capacitor having a reduced thickness has thus increased.

Multilayer ceramic capacitors with reduced thickness have problems such as extreme brittleness and low breaking strength.

This low breaking strength increases the possibility that the multilayer ceramic capacitor will be broken during processes such as measuring, selecting, and taping the multilayer ceramic capacitor or when mounting the multilayer ceramic capacitor.

In order to implement multilayer ceramic capacitors with reduced thickness commercially, the breaking strength of reduced thickness multilayer ceramic capacitors needs to be improved.

Conventionally, in order to improve breaking strength of reduced thickness multilayer ceramic capacitors, there have been attempts to insert a metal layer unrelated to implementation of electrical characteristics into the body. However, this has led to problems such as an increased process by adding the step of inserting the metal layer and a decreased capacitance due to the metal layer.

Multilayer ceramic capacitors include a cover portion, which is a protecting region of the ceramic body that does not contain internal electrodes. Since the cover portion is not protected by a metal layer, the cover portion's breaking strength rapidly decreases when the thickness is decreased below a predetermined amount.

In order to control brittleness of the cover portion, there is a need to secure a predetermined thickness or more as a thickness of an external electrode.

SUMMARY

An aspect of the present disclosure may provide a multilayer ceramic electronic component having excellent reliability.

According to an aspect of the present disclosure, a multilayer ceramic electronic component may include a ceramic body and first and second external electrodes on external surfaces of the ceramic body. The ceramic body includes dielectric layers, first internal electrodes, and second internal electrodes. The first and second internal electrodes are alternately stacked to face each other, with dielectric layers interposed therebetween. The ceramic body has first and second surfaces opposing each other, third and fourth surfaces connected to the first and second surfaces and opposing each other, and fifth and sixth surfaces connected to the first to fourth surfaces and opposing each other. The first and second external electrodes are electrically connected to the first and second internal electrodes, respectively. The ceramic body includes an active portion in which capacitance is formed, which includes the first and second internal electrodes, and upper and low cover portions on upper and lower surfaces of the active portion, respectively. A first ratio of a first thickness of one of the first and second external electrodes to a second thickness of one of the cover portions is proportional to the inverse of the cube root of a second ratio of a first Young's Modulus of one of the first and second external electrodes to a second Young's modulus of one of the cover portions.

According to another aspect of the present disclosure, a multilayer ceramic electronic component may include a ceramic body and external electrodes on external surfaces of the ceramic body. The ceramic body includes internal electrodes facing each other with dielectric layers interposed therebetween. The ceramic body has first and second surfaces opposing each other, third and fourth surfaces connected to the first and second surfaces and opposing each other, and fifth and sixth surfaces connected to the first to fourth surfaces and opposing each other. The external electrodes are electrically connected to respective internal electrodes. The ceramic body includes an active portion in which capacitance is formed, including the internal electrodes, and upper and lower cover portions on upper and lower surfaces of the active portion, respectively. and including ceramic material. The external electrodes each include a first electrode layer on one or more external surfaces of the ceramic body, including a first conductive metal, and a plating layer on the first electrode layer, and including a second conductive metal. The thickness of each of the external electrodes is a sum of the thicknesses of their respective first electrode layers and plating layers. The thicknesses are determined depending on the Young's moduli of the first conductive metal and the second conductive metal. A first ratio of the first thickness of one of the external electrodes to a second thickness of one of the cover portions is proportional to the inverse of the cube root of second and third ratios of the Young's moduli of the first conductive metal and the second conductive metal respectively to a Young's modulus of the ceramic material included in the cover portions.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
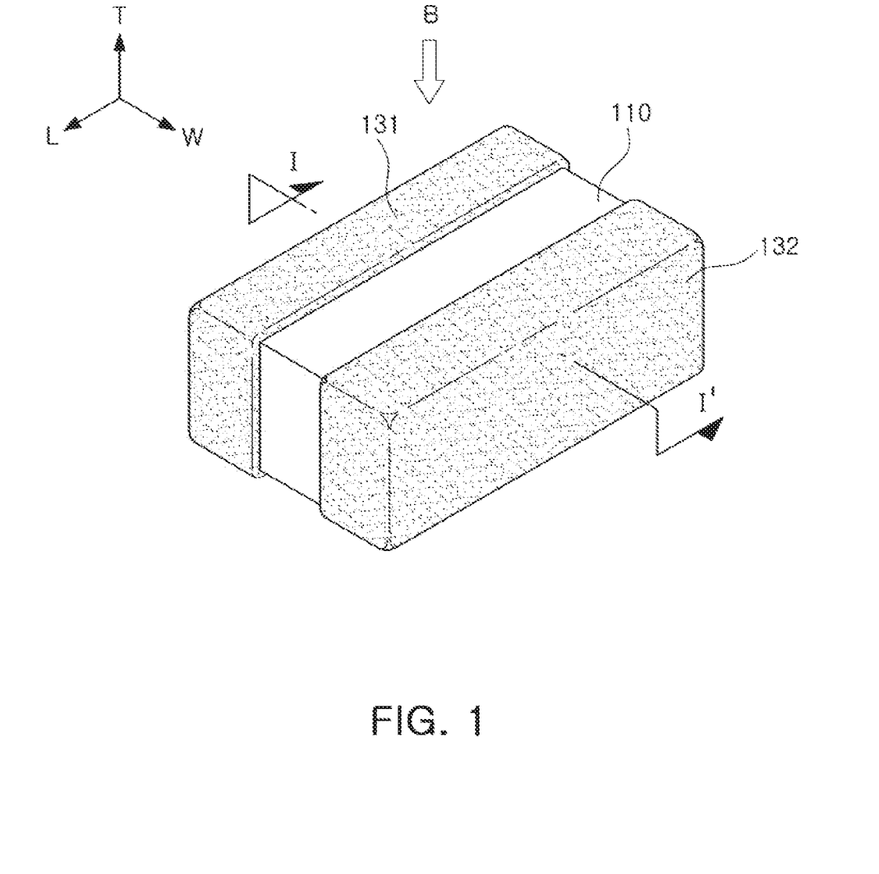
FIG. 1 is a perspective view illustrating a multilayer ceramic capacitor according to an exemplary embodiment in the present disclosure.

FIG. 1 is a perspective view illustrating a multilayer ceramic capacitor according to an exemplary embodiment in the present disclosure.

Figure 2:
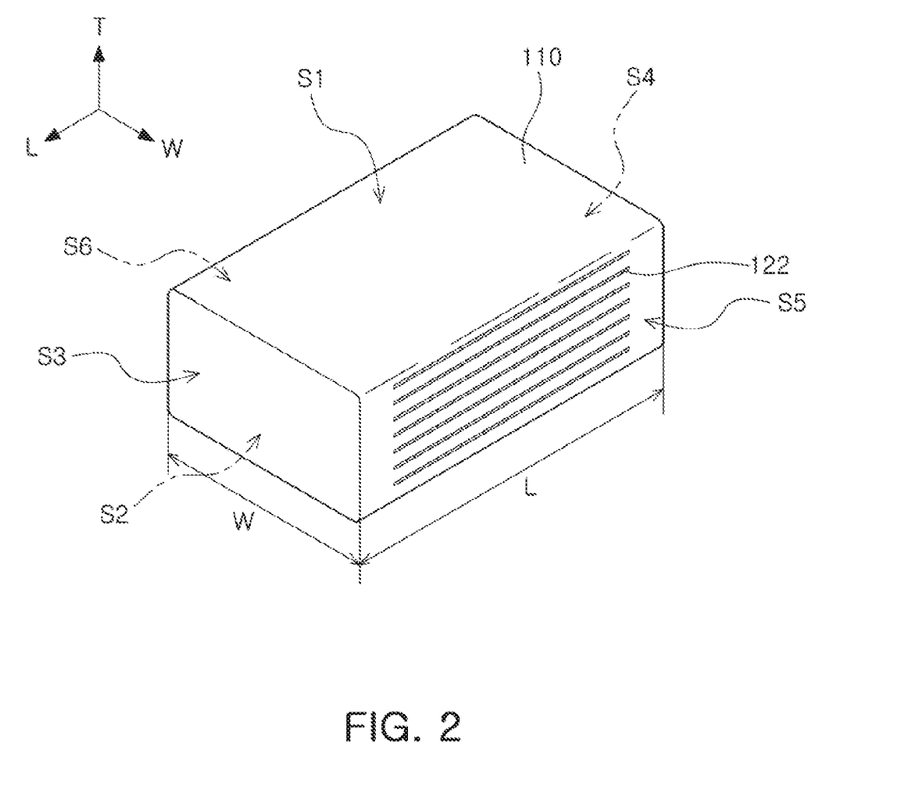
FIG. 2 is a schematic view illustrating a ceramic body according to an exemplary embodiment in the present disclosure.

FIG. 2 is a schematic view illustrating a ceramic body according to an exemplary embodiment in the present disclosure.

Figure 3:
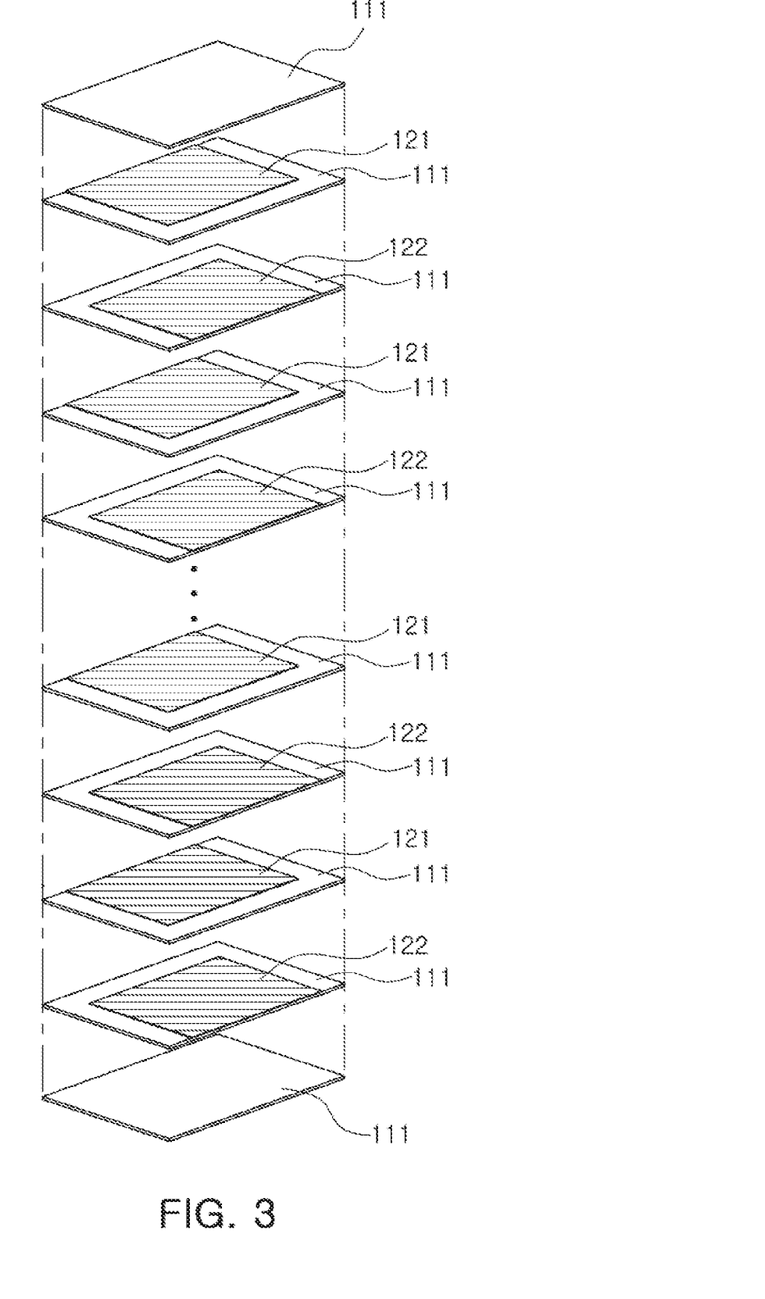
FIG. 3 is an exploded perspective view of FIG. 2.

FIG. 3 is an exploded perspective view of FIG. 2.

Figure 4:
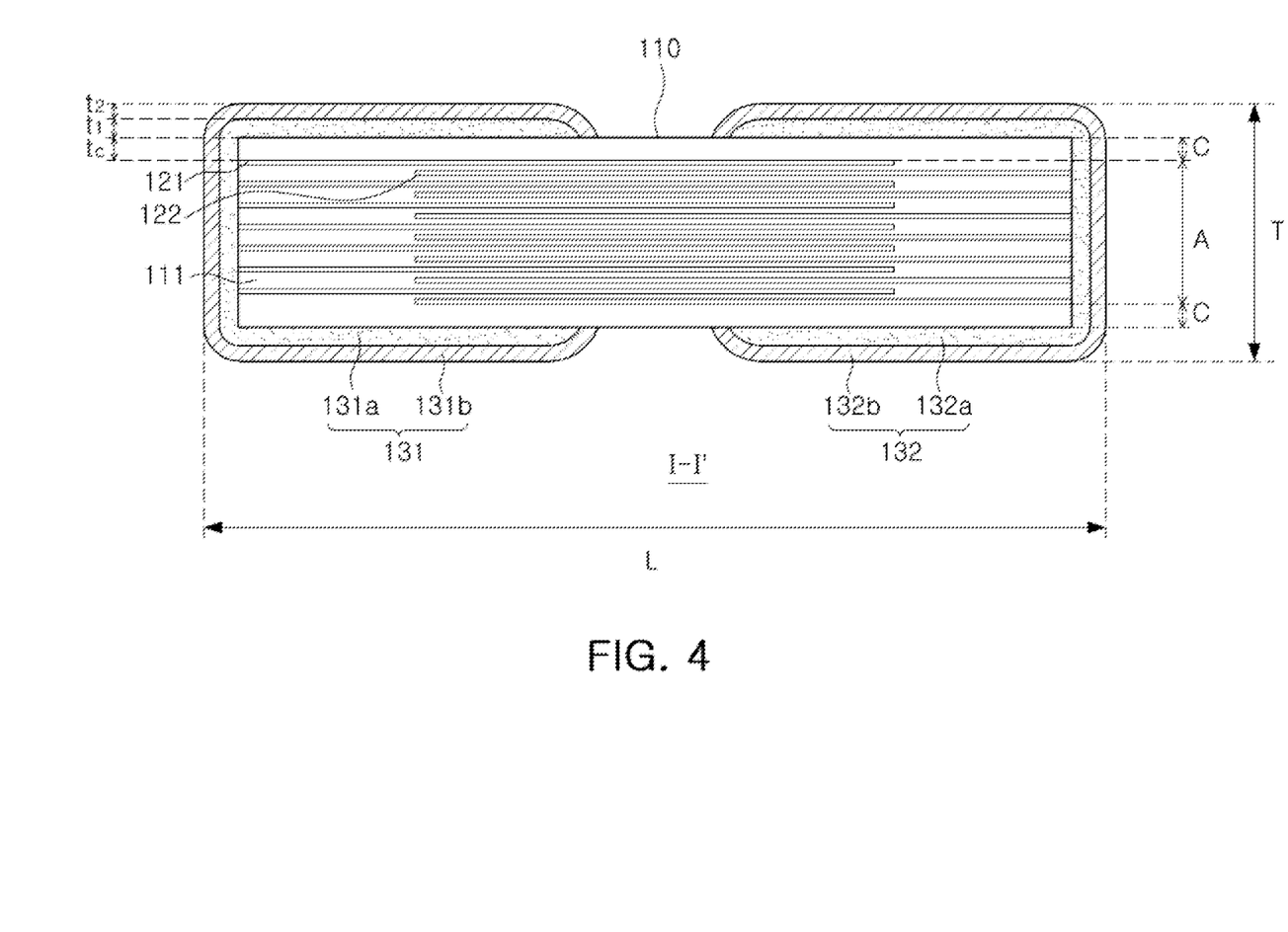
FIG. 4 is a cross-sectional view taken along line I-I' of FIG. 1 according to a first exemplary embodiment in the present disclosure.

FIG. 4 is a cross-sectional view taken along line I-I' of FIG. 1 according to a first exemplary embodiment in the present disclosure.

Referring to FIGS. 1 through 4, the multilayer ceramic electronic component according to an exemplary embodiment in the present disclosure may include a ceramic body 110 including dielectric layers 111 and first internal electrodes 121 and second internal electrodes 122 disposed to face each other with dielectric layers 111 interposed therebetween. The ceramic body 110 may have first and second surfaces S1 and S2 opposing each other in a thickness (T) direction, third and fourth surfaces S3 and S4 connected to the first and second surfaces S1 and S2 and opposing each other in a length (L) direction, and fifth and sixth surfaces S5 and S6 connected to the first to fourth surfaces and opposing each other in a width (W) direction. First and second external electrodes 131 and 132 may be disposed on external surfaces of the ceramic body 110 and may be electrically connected to the first and second internal electrodes 121 and 122, respectively. The ceramic body 110 includes an active portion "A" in which capacitance is formed, including the first internal electrodes 121 and the second internal electrodes 122 disposed to face each other with dielectric layers 111 interposed therebetween, and upper and lower cover portions "C" formed on upper and lower surfaces of the active portion A, respectively.

A multilayer ceramic electronic component according to an exemplary embodiment in the present disclosure, particularly, a multilayer ceramic capacitor will hereinafter be described. However, the multilayer ceramic electronic component according to the present disclosure is not limited thereto.

In the multilayer ceramic capacitor according to an exemplary embodiment in the present disclosure, a "length direction" refers to an "L" direction of FIG. 1, a "width direction" refers to a "W" direction of FIG. 1, and a "thickness direction" refers to a "T" direction of FIG. 1. Here, the "thickness direction" refers to a direction in which the dielectric layers are stacked, that is, a "stacked direction."

In an exemplary embodiment in the present disclosure, a shape of the ceramic body 110 is not particularly limited, but may be a hexahedral shape as illustrated.

The ceramic body 110 may have the first and second surfaces S1 and S2 opposing each other, the third and fourth surfaces S3 and S4 connecting the first and second surfaces to each other, and the fifth and sixth surfaces S5 and S6 connected to the first to fourth surfaces and opposing each other.

The first and second surfaces S1 and S2 refer to surfaces of the ceramic body 110 opposing each other in the thickness direction. The third and fourth surfaces S3 and S4 refer to surfaces of the ceramic body 110 opposing each other in the length direction. The fifth and sixth surfaces S5 and S6 refer to surfaces of the ceramic body 110 opposing each other in the width direction.

The shape of the ceramic body 110 is not particularly limited, but may be a rectangular parallelepiped shape as illustrated.

Ends of a plurality of internal electrodes 121 and 122 in the ceramic body 110 may be exposed to the fifth surface S5 or the sixth surface S6 of the ceramic body, respectively.

The internal electrodes 121 and 122 may include first internal electrodes 121 and second internal electrodes 122 having different polarities.

Ends of the first internal electrodes 121 may be exposed at the fifth surface S5, and ends of the second internal electrodes 122 may be exposed at the sixth surface S6.

The other ends of the first internal electrodes 121 and the second internal electrodes 122 may be formed to be spaced apart from the sixth surface S6 or the fifth surface S5, respectively, by a predetermined interval.

The first and second external electrodes 131 and 132 may be formed on the fifth and sixth surfaces S5 and S6 of the ceramic body, respectively, and may be electrically connected to the internal electrodes.

According to an exemplary embodiment in the present disclosure, the raw material of the dielectric layer 111 is not particularly limited as long as a sufficient capacitance may be obtained. For example, the raw material of the dielectric layer 111 may be barium titanate ($BaTiO_3$) powder particles.

The material of the dielectric layer 111 may be prepared by adding various ceramic additives, organic solvents, plasticizers, binders, dispersants, and the like, to powder particles such as the barium titanate ($BaTiO_3$) powder particles, or the like, according to an object of the present disclosure.

The ceramic body 110 may include the active portion "A" contributing to forming capacitance of the capacitor, and the upper and lower cover portions "C" formed as upper and lower margin portions on the upper and lower surfaces of the active portion A, respectively.

The active portion A may be formed by alternately stacking a plurality of first and second internal electrodes 121 and 122 with dielectric layers 111 interposed therebetween.

The upper and lower cover portions C may be formed of the same material as the dielectric layers 111 and have the same configuration as that of the dielectric layers 111 except that they do not include internal electrodes.

That is, the upper and lower cover portions C may include a ceramic material such as a barium titanate ($BaTiO_3$)-based ceramic material.

The upper and lower cover portions C may be formed by stacking a single dielectric layer or two or more dielectric layers on the upper and lower surfaces of the active portion A, respectively, in the stacking direction, and may serve to prevent damage to the internal electrodes due to physical or chemical stress.

The material of each of the first and second internal electrodes 121 and 122 is not particularly limited, but may be a conductive paste including one or more of silver (Ag), lead (Pb), platinum (Pt), nickel (Ni), and copper (Cu).

The multilayer ceramic capacitor according to an exemplary embodiment in the present disclosure may include the first external electrode 131 electrically connected to the first internal electrodes 121 and the second external electrode 132 electrically connected to the second internal electrodes 122.

The first and second external electrodes 131 and 132 may be electrically connected to the first and second internal electrodes 121 and 122, respectively, in order to form capacitance. The second external electrode 132 may be connected to a potential different than the potential to which the first external electrode 131 is connected.

The first and second internal electrodes 121 and 122 may be disposed to face each other with dielectric layers 111 interposed therebetween. The first and second internal electrodes 121 and 122 may be alternately exposed at the fifth surface S5 or the sixth surface S6 of the ceramic body 110 in the width direction, respectively.

The first and second internal electrodes 121 and 122 are alternately exposed at the fifth surface S5 or the sixth surface S6 of the ceramic body 110 in the width direction, respectively, such that a reverse geometry capacitor (RGC) or a low inductance chip capacitor (LICC) may be implemented as described below. In this instance, the length and width directions of the ceramic body are both perpendicular to the stacking direction and are designated based on the dimensions of the ceramic body, with the larger dimension of the ceramic body corresponding to the length direction and the shorter dimension of the ceramic body corresponding to the width direction.

In a general multilayer ceramic electronic component, external electrodes may be disposed on end surfaces of the ceramic body opposing each other in the length direction.

When the external electrodes are on opposing sides of the ceramic body in the length direction, the current path is relatively longer when applying an alternating current (AC) current to the external electrode and a large current loop may be formed. In addition, the magnitude of induced magnetic field is increased, such that the inductance may increase.

In order to solve the problem described above, according to an exemplary embodiment in the present disclosure, the first and second external electrodes 131 and 132 may be disposed, respectively, on the fifth and sixth surfaces S5 and S6 of the ceramic body 110 opposing each other in the width direction in order to make the current path shorter than if they were disposed, respectively, on the third and fourth surfaces S3 and S4 of the ceramic body opposing each other in the length direction.

In this case, the interval between the first and second external electrodes 131 and 132 is smaller, and the current path may thus become smaller. Therefore, the current loop may be decreased, such that the inductance may be decreased.

The first and second external electrodes 131 and 132 may be disposed, respectively, on the fifth and sixth surfaces S5 and S6 of the ceramic body 110 in the width direction, and may both extend to the first and second surfaces S1 and S2 of the ceramic body 110 in the thickness direction.

According to an exemplary embodiment in the present disclosure, areas of the first and second external electrodes 131 and 132 disposed on the first and second surfaces S1 and S2 of the ceramic body 110 in the thickness direction may collectively occupy 50% or more of an area of each of the first and second surfaces S1 and S2 of the ceramic body 110.

The first and second external electrodes 131 and 132 may include, respectively, first electrode layers 131a and 132a disposed on the external surfaces of the ceramic body 110 and including a first conductive metal. The first and second external electrodes 131 and 132 may also include, respectively, plating layers 131b and 132b disposed on the first electrode layers 131a and 132a and including a second conductive metal.

Although FIG. 4 illustrates the plating layers 131b and 132b including one layer, the plating layers 131b and 132b are not limited thereto, and may include, for example, two or more plating layers.

As described below, referring to FIG. 5, the plating layers may have a two-layer structure. Therefore, the plating layers may include first plating layers 131b and 132b and second plating layers 131c and 132c, respectively.

The first electrode layers 131a and 132a may include a first conductive metal and a glass.

In order to form capacitance, the first and second external electrodes 131 and 132 may be formed, respectively, on the fifth and sixth surfaces S5 and S6 of the ceramic body 110 in the width direction, and the first electrode layers 131a and 132a included in the first and second external electrodes 131 and 132 may be electrically connected to the first and second internal electrodes 121 and 122, respectively.

The first electrode layers 131a and 132a may be formed of the same conductive material as that of the first and second internal electrodes 121 and 122, but are not limited thereto. For example, the first electrode layers 131a and 132a may be formed of, for example, one or more first conductive metals selected from the group consisting of copper (Cu), silver (Ag), nickel (Ni), and alloys thereof.

The first electrode layers 131a and 132a may be formed by applying and then firing a conductive paste prepared by adding glass frit to first conductive metal powder particles.

According to an exemplary embodiment in the present disclosure, the first and second external electrodes 131 and 132 may include, respectively, the plating layers 131b and 132b disposed on the first electrode layers 131a and 132a and including the second conductive metal.

The second conductive metal is not particularly limited, and may be, for example, one or more selected from the group consisting of copper (Cu), nickel (Ni), tin (Sn), and alloys thereof.

The first conductive metal and the second conductive metal may be the same metal or may be different metals.

For example, the first conductive metal included in the first electrode layers 131a and 132a may be nickel (Ni), and the second conductive metal included in the plating layers 131b and 132b may be nickel (Ni), copper (Cu), or tin (Sn).

Likewise, the first conductive metal included in the first electrode layers 131a and 132a may be copper (Cu), and the second conductive metal included in the plating layers 131b and 132b may be nickel (Ni), copper (Cu), or tin (Sn).

According to an exemplary embodiment in the present disclosure, the thickness of the multilayer ceramic capacitor may be 100 μm or less.

Recently, in accordance with increased mounting density of circuit boards, there has been an increased demand for multilayer ceramic capacitors with a thickness of 100 μm or less. However, multilayer ceramic capacitors having a small thickness of 100 μm or less have problems such as increased brittleness and low breaking strength.

This low breaking strength increases the possibility that the multilayer ceramic capacitor will be broken when measuring, selecting, and taping the multilayer ceramic capacitor or when mounting the multilayer ceramic capacitor.

According to an exemplary embodiment in the present disclosure, the ratio between the thickness of one of the first and second external electrodes 131 and 132 and the thickness of one of the cover portions C may be adjusted based on the difference between the Young's modulus of the conductive metal of the first and second external electrodes 131 and 132 and the Young's modulus of the ceramic material of the cover portions C. This can increase the breaking strength of a multilayer ceramic capacitor with a small thickness of 100 μm or less, to prevent decreased reliability caused by damage to the multilayer ceramic capacitor or cracks.

Figure 5:
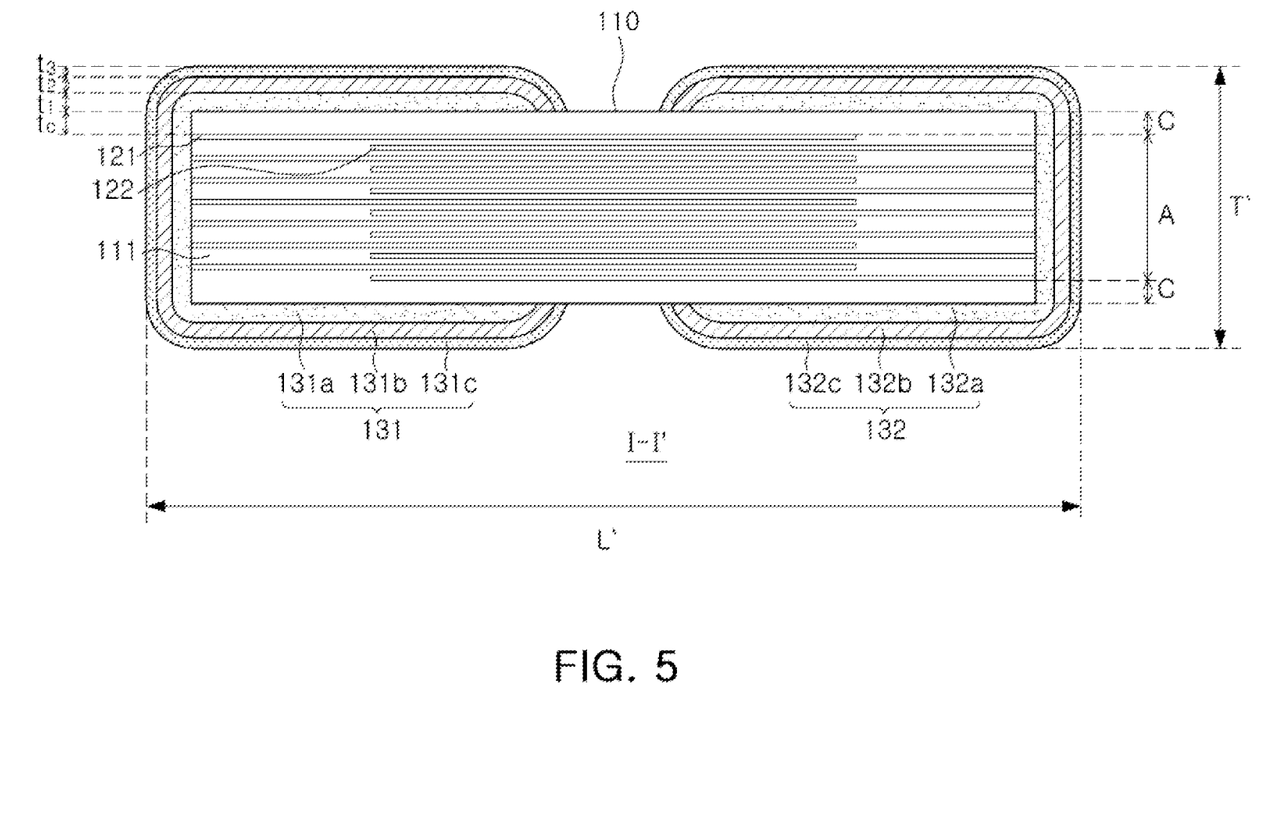
FIG. 5 is a cross-sectional view taken along line I-I' of FIG. 1 according to a second exemplary embodiment in the present disclosure.

According to an exemplary embodiment in the present disclosure, the ratio of the thickness (for example, the sum of $t_1$ and $t_2$ for an external electrode as in FIG. 4 or the sum of $t_1$, $t_2$, and $t_3$ for an external electrode as in FIG. 5) of the first and second external electrodes 131 and 132 to the thickness $t_c$ of either of the upper or lower cover portions C may be proportional to the inverse of the cube root of the ratio of the Young's Modulus of the first and second external electrodes 131 and 132 to the Young's modulus of the cover portion C.

According to an exemplary embodiment in the present disclosure, the thickness of the first and second external electrodes 131 and 132 depending on the thickness $t_c$ of the cover portions C may be determined based on the cube root value of the ratio of the Young's Modulus of the conductive metal of the first and second external electrodes 131 and 132 to the Young's modulus of the ceramic material of the cover portion C.

Since there is no metal layer in the cover portion C, when the thickness of the cover portion is decreased below a predetermined thickness, the breaking strength of the cover portion may rapidly decrease.

In order to control the brittleness of the cover portion C, a predetermined thickness or more needs to be secured as the thickness of an external electrode in order to prevent cracks from occurring in the multilayer ceramic capacitor.

In an exemplary embodiment in the present disclosure, an appropriate thickness of the external electrode for complementing the low breaking strength of a cover portion C with a small thickness may be selected. In detail, the ratio of the thickness of the external electrodes to the thickness $t_c$ of the cover portions C, may be in proportion to the inverse of the cube root value of the ratio of the Young's Modulus of the conductive metal of the first and second external electrodes 131 and 132 to the Young's modulus of the ceramic material of the cover portion C.

Therefore, according to the present disclosure a minimum thickness of the external electrode may be numerically determined that can prevent decreased reliability when the cover portion C has a small thickness in a multilayer ceramic capacitor with a small thickness of 100 μm or less.

According to an exemplary embodiment in the present disclosure, in the multilayer ceramic capacitor with a small thickness of 100 μm or less, the ratio of the thickness of the external electrode to the thickness of the cover portion may be determined. In a multilayer ceramic capacitor according to the related art having a thickness exceeding 100 μm, problems such as damage and cracks in the process do not occur due to the greater thickness of the cover portion.

In order to obtain the ratio of the thickness of the external electrode that may prevent decreased reliability due to damage and cracks to the thickness $t_c$ of the cover portion C, which becomes the reference, the ratio of the Young's Modulus of the conductive metal of the first and second external electrodes 131 and 132 to the Young's modulus of the ceramic material of the cover portion C may be calculated, and the cube root value of the ratio may be derived.

The thickness of the external electrode depending on the material of the external electrode may be derived by the method described above based on the cover portion C including barium titanate ($BaTiO_3$) as the ceramic material.

For example, the external electrode may include nickel (Ni), which has a Young's modulus of about 70% of the Young's modulus of the cover portion C. The external electrode thickness needs to be 80% or more of the thickness of the cover portion C in order to prevent decreased reliability due to damage and cracks.

As another example, when the external electrode includes copper (Cu) having a Young's modulus of about 50% of the Young's modulus of the cover portion C, the external electrode thickness needs to be 96% or more of the thickness of the cover portion C in order to prevent decreased reliability due to damage cracks.

As another example, when the external electrode includes tin (Sn) having a Young's modulus of about 20% of the Young's modulus of the cover portion C, the external electrode thickness needs to be 130% or more of the thickness of the cover portion C in order to prevent decreased reliability due to damage cracks.

As described above, the first and second external electrodes 131 and 132 may include, respectively, the first electrode layers 131a and 132a, which include a first conductive metal, and plating layers 131b and 132b disposed on the first electrode layers 131a and 132a, which include a second conductive metal.

The thickness of each of the first and second external electrodes 131 and 132 may be the sum of thicknesses of the first electrode layers 131a and 132a and the plating layers 131b and 132b. The minimum thicknesses of first electrodes layers and plating layers may be determined based on the Young's modulus of the first conductive metal and the Young's modulus of the second conductive metal.

When the first conductive metal and the second conductive metal are the same metal, the thickness of each of the first and second external electrodes 131 and 132 may be determined by the approach described above.

For example, when the thickness $t_c$ of the cover portion C is 10 μm and the first and second conductive metals are both nickel (Ni), the total thickness of each of the first and second external electrodes 131 and 132 (that is, the sum of $t_1$ and $t_2$ in FIG. 4) needs to be 8 μm or more, which is 80% or more of the thickness $t_c$ of the cover portion C. For example, the thickness $t_1$ of each of the first electrode layers 131a and 132a can be 3 μm and the thickness $t_2$ of each of the plating layers 131b and 132b can be 5 μm.

The first conductive metal and the second conductive metal may be different metals. In this case, the minimum total thickness of each of the first and second external electrodes 131 and 132 may be determined by combining fractions of thicknesses of the respective layers of the external electrode, including the respective metals, in a total thickness of the external electrode and ratios of Young's moduli of the respective metals to the Young's modulus of the cover portion C.

For example, when the thickness of the cover portion C is 10 μm, the first conductive metal is nickel (Ni), and the second conductive metal is copper (Cu), the total thickness of each of the first and second external electrodes 131 and 132 needs to be 9 μm or more, which is 90% or more of the thickness $t_c$ of the cover portion C. For example, the thickness $t_1$ of each of the first electrode layers 131a and 132a may be 3 μm and the thickness $t_2$ of each of the plating layers 131b and 132b may be 6 μm.

In summary, the thickness of each of the first and second external electrodes 131 and 132 may be 80% or more of the thickness of the cover portion C.

Meanwhile, when the Young's moduli of the first conductive metal and the second conductive metal are 70% or more of the Young's modulus of the ceramic of the cover portion C, the total thickness of each of the first and second external electrodes 131 and 132 may be 80% or more of the thickness $t_c$ of the cover portion C.

When the Young's moduli of the first conductive metal and the second conductive metal are 50% or more and less than 70% of the Young's modulus of the ceramic of the cover portion C, the total thickness of each of the first and second external electrodes 131 and 132 may be 96% or more of the thickness $t_c$ of the cover portion C.

When the Young's moduli of the first conductive metal and the second conductive metal are 20% or more and less than 50% of the Young's modulus of the ceramic of the cover portion C, the total thickness of each of the first and second external electrodes 131 and 132 may be 130% or more of the thickness $t_c$ of the cover portion C.

Referring to FIG. 4, the thickness $t_c$ of the cover portion C may be 1/40 or less of the length "L" of the multilayer ceramic electronic component, and may be 1/5 or less of the thickness "T" of the multilayer ceramic electronic component.

When the thickness $t_c$ of the cover portion C is 1/40 or less of the length L of the multilayer ceramic electronic component or 1/5 or less of the thickness T of the multilayer ceramic electronic component, breaking strength may rapidly decrease, such that reliability may decrease due to damage or cracks.

However, according to a first exemplary embodiment in the present disclosure, even though the thickness $t_c$ of the cover portion C is 1/40 or less of the length L of the multilayer ceramic electronic component and 1/5 or less of the thickness T of the multilayer ceramic electronic component, the ratio between the thickness of the external electrode and the thickness of the cover portion may be adjusted based on the Young's moduli of the conductive metal of the external electrode and the ceramic material of the cover portion in the ceramic body to increase the breaking strength of the multilayer ceramic electronic component. As such, it is possible to prevent decreased reliability of the multilayer ceramic electronic component due to damage cracks.

FIG. 5 is a cross-sectional view taken along line I-I' of FIG. 1 according to a second exemplary embodiment in the present disclosure.

As described above, the plating layers may have a two-layer structure. Therefore, the plating layers may include the first plating layers 131b and 132b and the second plating layers 131c and 132c, respectively.

Referring to FIG. 5, in the multilayer ceramic capacitor according to a second exemplary embodiment in the present disclosure, the first and second external electrodes 131 and 132 may include, respectively, plating layers disposed on the first electrode layers 131a and 132a, which include the second conductive metal. The plating layers may include first plating layers 131b and 132b and second plating layers 131c and 132c, respectively.

The second conductive metal is not particularly limited, but may be, for example, one or more selected from the group consisting of copper (Cu), nickel (Ni), tin (Sn), and alloys thereof.

The first conductive metal and the second conductive metal may be the same metal or may be different metals.

For example, the first conductive metal included in the first electrode layers 131a and 132a may be nickel (Ni), the second conductive metal included in the first plating layers 131b and 132b of the plating layers may be nickel (Ni), and the second plating layers 131c and 132c of the plating layers may include tin (Sn).

In this case, the ratio of the total thickness (that is, the sum of $t_1$, $t_2$, and $t_3$ in FIG. 5) of each of the first and second external electrodes 131 and 132 to the thickness $t_c$ of the cover portion C may be in proportion to the inverse of the cube root of a ratio of a Young's Modulus of each of the first and second external electrodes 131 and 132 to a Young's modulus of the cover portion C.

As described above, the first conductive metal and the second conductive metal may be different metals. In this case, the minimum thickness of each of the first and second external electrodes 131 and 132 may be determined by combining fractions of thicknesses of the respective layers of the external electrode, including the respective metals, in an overall thickness of the external electrode and ratios of Young's moduli of the respective metals to the Young's modulus of the cover portion C.

For example, when the thickness of the cover portion C is 10 μm, the first conductive metal is nickel (Ni), the second conductive metal included in the first plating layers 131b and 132b is nickel (Ni), and a third conductive metal included in the second plating layers 131c and 132c is tin (Sn), the total thickness of each of the first and second external electrodes 131 and 132 needs to be 10 μm or more, which is 100% or more of the thickness $t_c$ of the cover portion C. For example, the thickness $t_1$ of each of the first electrode layers 131a and 132a may be 3 μm, the thickness $t_2$ of each of the first plating layers 131b and 132b may be 4 μm, and the thickness $t_3$ of each of the second plating layers 131c and 132c may be 2 μm.

Referring to FIG. 5, the thickness $t_c$ of the cover portion C may be 1/40 or less of the length L' of the multilayer ceramic electronic component, and may be 1/5 or less of the thickness T' of the multilayer ceramic electronic component.

Figure 6:
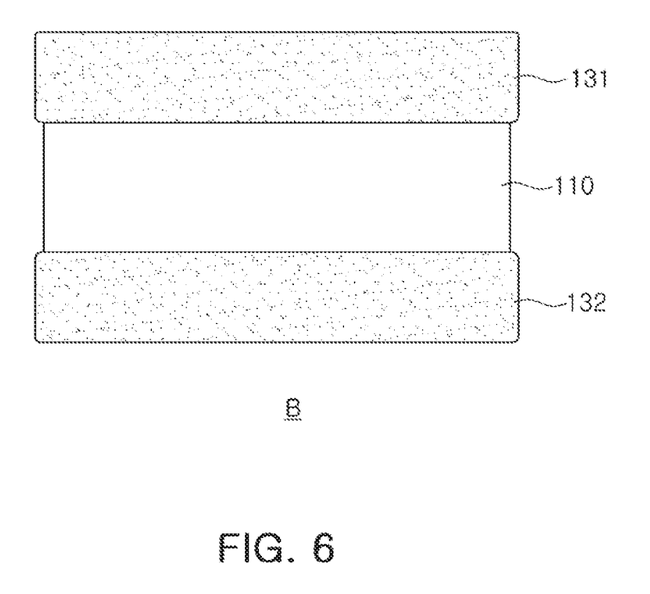
FIG. 6 is a top plan view when viewed in direction B of FIG. 1.

FIG. 6 is a top plan view when viewed in direction B of FIG. 1.

Referring to FIG. 6, the areas of the first and second external electrodes 131 and 132 disposed on the first and second surfaces S1 and S2 of the ceramic body 110 in the thickness direction may occupy 50% or more of the area of each of the first and second surfaces S1 and S2 of the ceramic body 110.

A multilayer ceramic electronic component according to another exemplary embodiment in the present disclosure may include a ceramic body 110 and external electrodes 131 and 132 disposed on external surfaces of the ceramic body 110. The ceramic body 110 may include internal electrodes 121 and 122 disposed to face each other with dielectric layers 111 interposed therebetween. The ceramic body 110 may have first and second surfaces S1 and S2 opposing each other, third and fourth surfaces S3 and S4 connected to the first and second surfaces S1 and S2 and opposing each other, and fifth and sixth surfaces S5 and S6 connected to the first to fourth surfaces and opposing each other. The external electrodes 131 and 132 may be electrically connected to the internal electrodes 121 and 122, respectively. The ceramic body 110 may include an active portion A, in which capacitance is formed by the internal electrodes 121 and 122 with dielectric layers 111 interposed therebetween, and upper and lower cover portions C formed on upper and lower surfaces of the active portion A, respectively. The cover portions may include ceramic material. The external electrodes 131 and 132 may include, respectively, first electrode layers 131a and 132a disposed on the external surfaces of the ceramic body 110, and including a first conductive metal, and plating layers 131b and 132b disposed on the first electrode layers 131a and 132a, and including a second conductive metal. The thickness of the external electrodes 131 and 132 is the sum of the thickness of the first electrode layers 131a and 132a and the thickness of the plating layers 131b and 132b, respectively. The thickness of the external electrodes 131 and 132 may be determined based on the Young's modulus of the first conductive metal, the Young's modulus of the second conductive metal, and the ratio of the thickness of the external electrodes 131 and 132 to the thickness $t_c$ of the cover portion C is in proportion to the inverse of the cube root of ratios of the Young's moduli of the first conductive metal and the second conductive metal to a Young's modulus of the ceramic of the cover portion C.

In the description below for the multilayer ceramic electronic component according to another exemplary embodiment in the present disclosure, overlapping features will be omitted.

According to another exemplary embodiment in the present disclosure, as described above, the ratio between the thickness of the external electrode and the thickness of the cover portion may be adjusted depending on the difference between the Young's modulus of the conductive metal of the external electrode and the Young's modulus of the ceramic material of the cover portion in the ceramic body to increase breaking strength of a multilayer ceramic capacitor with a small thickness. As such, it may be possible to prevent decreased reliability due to damage and cracks in the multilayer ceramic capacitor.

Hereinafter, a method of manufacturing a multilayer ceramic electronic component according to an exemplary embodiment in the present disclosure will be described, but the present disclosure is not limited thereto.

In the method of manufacturing a multilayer ceramic electronic component according to an exemplary embodiment in the present disclosure, slurry including powder particles such as barium titanate (BaTiO$_3$) powder particles, or the like, may be first applied onto carrier films and dried to prepare a plurality of ceramic green sheets, resulting in dielectric layers.

The ceramic green sheet may be manufactured by preparing slurry by mixing ceramic powder particles, a binder, and a solvent with one another and manufacturing the slurry in a sheet shape having a thickness of several μm by a doctor blade method.

A conductive paste for an internal electrode including 40 to 50 parts by weight of nickel powder particles having an average particle size of 0.1 to 0.2 μm may be prepared.

The conductive paste for an internal electrode was applied onto the ceramic green sheets by a screen printing method to form the internal electrodes, and the ceramic green sheets on which internal electrode patterns are disposed were stacked to form the ceramic body 110.

The first electrode layers including the first conductive metal and the glass may be formed on the external surfaces of the ceramic body.

The first conductive metal is not particularly limited, but may be, for example, one or more selected from the group consisting of copper (Cu), silver (Ag), nickel (Ni), and alloys thereof.

The glass is not particularly limited, but may be a material having the same composition as that of a glass used to manufacture an external electrode of a general multilayer ceramic capacitor.

The first electrode layers may be formed on upper and lower surfaces and end portions of the ceramic body to be electrically connected to the first and second internal electrodes, respectively.

The first electrode layer may include 5 vol % or more of glass based on the first conductive metal.

The plating layers including the second conductive metal may be formed on the first electrode layers.

The second conductive metal is not particularly limited, but may be, for example, one or more selected from the group consisting of copper (Cu), nickel (Ni), tin (Sn), and alloys thereof.

According to an exemplary embodiment in the present disclosure, the ratio between the thickness of the external electrode and the thickness of the cover portion may be adjusted depending on the difference between the Young's modulus of the conductive metal of the external electrode and the Young's modulus of the ceramic material of the cover portion in the ceramic body.

That is, the thickness of the external electrode may be determined to be in proportion to the inverse of the cube root of the ratio of the Young's modulus of the external electrode to the Young's modulus of the cover portion depending on the difference between the Young's modulus of the conductive metal of the external electrode and the Young's modulus of the ceramic material of the cover portion in the ceramic body.

In Table 1, external electrodes having various thicknesses and kinds of conductive metals were disposed on the external surfaces of ceramic bodies with varying thicknesses of cover portions, and crack occurrence frequencies were measured.

TABLE 1

| Sample No. | Thickness (μm) of Cover Portion | Thickness (μm) of External Electrode Including Nickel (Ni) | Thickness (μm) of External Electrode Including Copper (Cu) | Thickness (μm) of External Electrode Including Tin (Sn) | Crack Occurrence Frequency (%) |
|---|---|---|---|---|---|
| *1 | 10 | 3.5 | 0 | 0 | 80 |
| *2 | 10 | 5.4 | 0 | 0 | 50 |
| 3 | 10 | 8.1 | 0 | 0 | 0 |
| 4 | 10 | 10.2 | 0 | 0 | 0 |
| *5 | 10 | 0 | 3.4 | 0 | 90 |
| *6 | 10 | 0 | 5.2 | 0 | 70 |
| *7 | 10 | 0 | 6.9 | 0 | 50 |
| 8 | 10 | 0 | 9.6 | 0 | 0 |

TABLE 1-continued

| Sample No. | Thickness (μm) of Cover Portion | Thickness (μm) of External Electrode Including Nickel (Ni) | Thickness (μm) of External Electrode Including Copper (Cu) | Thickness (μm) of External Electrode Including Tin (Sn) | Crack Occurrence Frequency (%) |
|---|---|---|---|---|---|
| 9 | 10 | 0 | 12.4 | 0 | 0 |
| *10 | 10 | 0 | 0 | 5.6 | 80 |
| *11 | 10 | 0 | 0 | 8.4 | 65 |
| 12 | 10 | 0 | 0 | 13.7 | 0 |
| 13 | 10 | 0 | 0 | 18.2 | 0 |
| *14 | 8 | 2.8 | 0 | 0 | 90 |
| *15 | 8 | 4.6 | 0 | 0 | 60 |
| 16 | 8 | 6.5 | 0 | 0 | 0 |
| 17 | 8 | 9.1 | 0 | 0 | 0 |
| *18 | 8 | 0 | 3.2 | 0 | 85 |
| *19 | 8 | 0 | 5.4 | 0 | 60 |
| 20 | 8 | 0 | 7.5 | 0 | 0 |
| 21 | 8 | 0 | 10.3 | 0 | 0 |
| *22 | 8 | 0 | 0 | 4.5 | 90 |
| *23 | 8 | 0 | 0 | 10.1 | 55 |
| 24 | 8 | 0 | 0 | 12.6 | 0 |
| 25 | 8 | 0 | 0 | 15.5 | 0 |
| *26 | 8 | 1.2 | 0 | 7.1 | 60 |
| *27 | 8 | 2.3 | 0 | 5.4 | 15 |
| *28 | 8 | 3.5 | 0 | 3.9 | 35 |
| 29 | 8 | 3.2 | 0 | 5.7 | 0 |
| 30 | 8 | 4.4 | 0 | 3.6 | 0 |

*Comparative Example

The data in Table 1 was obtained by measuring dimensions of each capacitor from an image, captured by a scanning electron microscope (SEM), of a cross-section of each capacitor cut in a length-thickness direction (L-T) in a central portion of the ceramic body 110 of the multilayer ceramic capacitor 100 in the width direction W of the ceramic body 110, as illustrated in FIG. 4. Here, a thickness of each external electrode was measured as the sum of the first electrode layer and the plating layer (e.g., the sum of $t_1$ and $t_2$ in FIG. 4). In order to measure the crack occurrence frequency, 200 specimens per sample were analyzed.

Samples 1 and 2 are Comparative Examples in which the thickness of the cover portion C is 10 μm and the thickness of each of first and second external electrodes 131 and 132 including nickel (Ni) is less than 80% of the thickness of the cover portion, and the crack occurrence frequency is high.

Samples 3 and 4 are Inventive Examples in which the thickness of the cover portion C is 10 μm and the thickness of each of the first and second external electrodes 131 and 132 including nickel (Ni) is 80% or more of the thickness of the cover portion, and no cracks occur, such that reliability is excellent.

Samples 5 to 7 are Comparative Examples in which the thickness of the cover portion C is 10 μm and the thickness of each of the first and second external electrodes 131 and 132 including copper (Cu) is less than 90% of the thickness of the cover portion, and the crack occurrence frequency is high.

Samples 8 and 9 are Inventive Examples in which the thickness of the cover portion C is 10 μm and the thickness of each of first and second external electrodes 131 and 132 including copper (Cu) is 90% or more of the thickness of the cover portion, and no cracks occur, such that reliability is excellent.

Samples 10 and 11 are Comparative Examples in which the thickness of the cover portion C is 10 μm and the thickness of each of the first and second external electrodes 131 and 132 including tin (Sn) is less than 130% of the thickness of the cover portion, and the crack occurrence frequency is high.

Samples 12 and 13 are Inventive Examples in which the thickness of a cover portion C is 10 μm and the thickness of each of the first and second external electrodes 131 and 132 including tin (Sn) is 130% or more of the thickness of the cover portion, and no cracks occur, such that reliability is excellent.

Samples 14 and 15 are Comparative Examples in which the thickness of the cover portion C is 8 μm and the thickness of each of the first and second external electrodes 131 and 132 including nickel (Ni) is less than 80% of the thickness of the cover portion, and the crack occurrence frequency is high.

Samples 16 and 17 are Inventive Examples in which the thickness of the cover portion C is 8 μm and the thickness of each of first and second external electrodes 131 and 132 including nickel (Ni) is 80% or more of the thickness of the cover portion, and no cracks occur, such that reliability is excellent.

Samples 18 to 19 are Comparative Examples in which the thickness of the cover portion C is 8 μm and the thickness of each of the first and second external electrodes 131 and 132 including copper (Cu) is less than 90% of the thickness of the cover portion, and the crack occurrence frequency is high.

Samples 20 and 21 are Inventive Examples in which the thickness of the cover portion C is 8 μm and the thickness of each of first and second external electrodes 131 and 132 including copper (Cu) is 90% or more of the thickness of the cover portion, and no cracks occur, such that reliability is excellent.

Samples 22 and 23 are Comparative Examples in which the thickness of the cover portion C is 8 μm and the thickness of each of first and second external electrodes 131 and 132 including tin (Sn) is less than 130% of the thickness of the cover portion, and the crack occurrence frequency is high.

Samples 24 and 25 are Inventive Examples in which the thickness of the cover portion C is 8 μm and the thickness of each of the first and second external electrodes 131 and 132 including tin (Sn) is 130% or more of the thickness of the cover portion, and no cracks occur, such that reliability is excellent.

Samples 26 to 30 are cases with different first and second conductive metals, such as where the first conductive metal is nickel (Ni) and the second conductive metal is tin (Sn). In this case, the required thickness of each of first and second external electrodes 131 and 132 may be determined by combining fractions of thicknesses of the respective layers of an external electrode including the respective metals in an overall thickness of the external electrode and ratios of Young's moduli of the respective metals to a Young's modulus of a cover portion C.

Samples 26 to 28 are Comparative Examples in which the thickness of the cover portion C is 8 μm and the ratio of the thickness of each of first and second external electrodes 131 and 132 including nickel (Ni) and tin (Sn) to the thickness of the cover portion is out of a numeral range of the present disclosure, and crack occurrence frequency is high.

Samples 29 and 30 are Inventive Examples in which the thickness of the cover portion C is 8 μm and the ratio of the thickness of each of first and second external electrodes 131 and 132 including nickel (Ni) and tin (Sn) to the thickness of the cover portion is within a numeral range of the present disclosure, and no cracks occur, such that reliability is excellent.

As set forth above, according to the exemplary embodiment in the present disclosure, the ratio between the thickness of the external electrode and the thickness of the cover portion may be adjusted depending on the difference between the Young's modulus of the conductive metal of the external electrode and the Young's modulus of the ceramic material of the cover portion in the ceramic body to increase the breaking strength of the multilayer ceramic capacitor with a small thickness. As such, it is possible to prevent decreased reliability due to damage or cracks in the multilayer ceramic capacitor.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
    a ceramic body, including first and second internal electrodes facing each other with dielectric layers interposed therebetween, and having first and second surfaces opposing each other, third and fourth surfaces connected to the first and second surfaces and opposing each other, and fifth and sixth surfaces connected to the first to fourth surfaces and opposing each other; and
    first and second external electrodes on external surfaces of the ceramic body and connected to the first and second internal electrodes, respectively,
    wherein the ceramic body includes an active portion, in which capacitance is formed, that includes the first and second internal electrodes facing each other with dielectric layers interposed therebetween, and upper and lower cover portions formed on upper and lower surfaces of the active portion, respectively,
    the first and second external electrodes each include a first electrode layer on an external surface of the ceramic body and including a first conductive metal, and a plating layer on the first electrode layer and including a second conductive metal,
    the second conductive metal is one or more selected from the group consisting of nickel (Ni), tin (Sn), and alloys thereof,
    wherein a thickness of at least one of the upper or lower cover portion is 1/40 or less of a length of the multilayer ceramic electronic component, and
    wherein a thickness of the multilayer ceramic electronic component is 100 μm or less.

2. The multilayer ceramic electronic component of claim 1, wherein the first conductive metal is one or more selected from the group consisting of copper (Cu), silver (Ag), nickel (Ni), and alloys thereof.

3. The multilayer ceramic electronic component of claim 1, wherein the plating layer includes two or more layers.

4. The multilayer ceramic electronic component of claim 1, wherein the thickness of the at least one of the upper or lower cover portion is 1/5 or less of the thickness of the multilayer ceramic electronic component.

5. The multilayer ceramic electronic component of claim 1, wherein a length of the ceramic body is a distance between the third surface and the fourth surface, a width of the ceramic body is a distance between the fifth surface and the sixth surface, the length is greater than the width, and the first internal electrodes and the second internal electrodes are alternately exposed at the fifth surface and the sixth surface.

6. The multilayer ceramic electronic component of claim 1,
    wherein the first and second external electrodes are on the fifth and sixth surfaces of the ceramic body, respectively, and each extend to the first and second surfaces, and
    wherein 50% or more of each of upper and lower areas of the respective first and second surfaces of the ceramic body are covered by the first and second external electrodes.

7. The multilayer ceramic electronic component of claim 1, wherein the at least one of the upper or lower cover portion includes a barium titanate (BaTiO3)-based ceramic material.

* * * * *